United States Patent [19]

Richmond et al.

[11] 4,305,150

[45] Dec. 8, 1981

[54] ON-LINE CHANNEL QUALITY MONITOR FOR A COMMUNICATION CHANNEL

[75] Inventors: Robert L. Richmond, Frederick; Paul F. Wyar, Mt. Airy, both of Md.

[73] Assignee: Digital Communications Corporation, Gaithersburg, Md.

[21] Appl. No.: 44,142

[22] Filed: May 31, 1979

[51] Int. Cl.³ .................... H04B 17/00; G06F 11/00
[52] U.S. Cl. ...................... 371/6; 328/115; 371/5; 455/67
[58] Field of Search ............... 371/5, 6; 328/115, 150, 328/151, 165, 166; 455/67, 63, 135; 307/350, 351

[56] References Cited

U.S. PATENT DOCUMENTS

| | | | |
|---|---|---|---|
| 3,177,351 | 4/1965 | Freiman | 371/5 |
| 3,568,150 | 3/1971 | Games | 371/5 |
| 3,573,727 | 4/1971 | Freeny | 371/6 |
| 3,593,275 | 7/1971 | Pumpe | 371/6 |
| 3,638,183 | 1/1972 | Progler et al. | 371/6 |
| 3,721,959 | 3/1973 | George | 371/5 |
| 3,961,271 | 6/1976 | Zlydak et al. | 328/115 |

OTHER PUBLICATIONS

Gooding, Performance Monitor Techniques for Digital Receivers Based on Extrapolation of Error Rate, IEEE Trans. on Comm. Tech., vol. Com-16, No. 3, Jun. 1968, pp. 380-387.

Sundberg, Soft Decision Demodulation for PCM Encoded Speech Signals, IEEE Trans. on Comm., vol. COM-26, No. 6, Jun. 1968, pp. 854-859.

Leon et al., A Bit Error Rate Monitor for Digital PSK Links, IEEE Trans. on Comm., vol. 23, No. 5, May 1975, pp. 518-524.

Keelty et al., On-Line Pseudo-Error Monitors for Digital Transmission Systems, IEEE Trans. on Comm., vol. COM-26, No. 8, Aug. 1978, pp. 1275-1282.

Primary Examiner—Charles E. Atkinson
Attorney, Agent, or Firm—Pollock, Vande Sande & Priddy

[57] ABSTRACT

An on-line channel monitor, for measuring $E_b/N_O$, measures the quality of a communication channel while the channel is in use. The channel monitor employs a soft-decision demodulator so as to compare analog signal levels of an AGC compensated signal in a demodulator with the desired signal level. Deviations, termed pseudo-errors, are counted and the number of counts integrated. The result is employed to drive a meter calibrated in terms of $E_b/N_O$.

20 Claims, 5 Drawing Figures

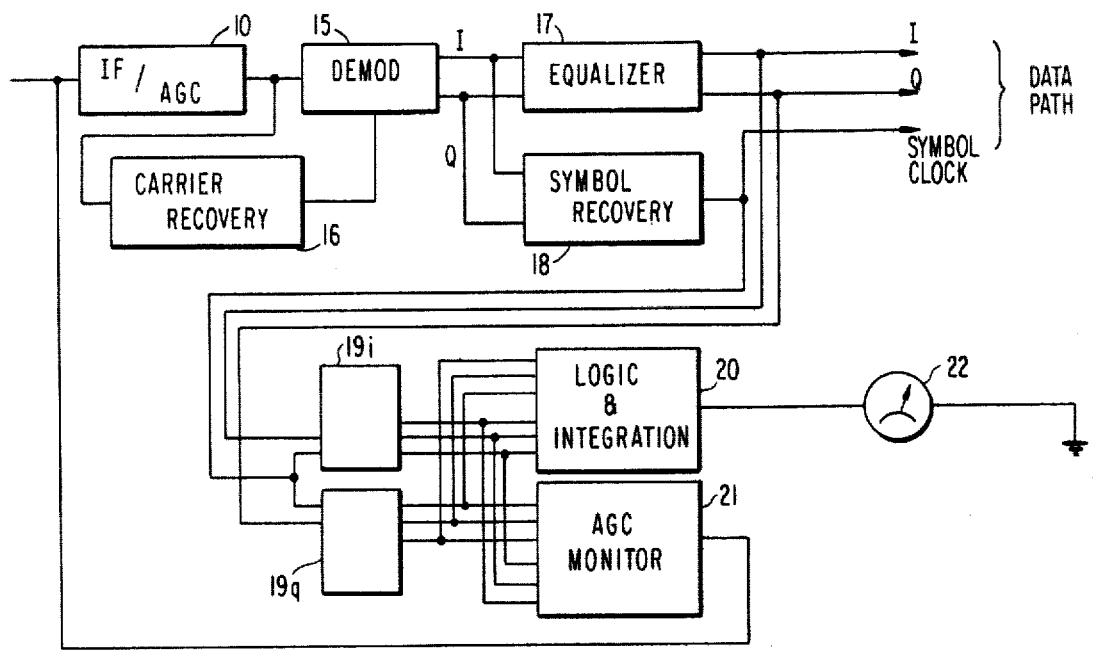
FIG. 1
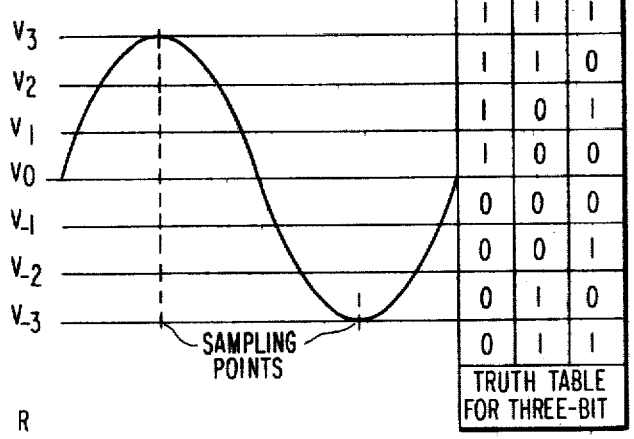
FIG. 2 THREE-BIT SOFT DECISION
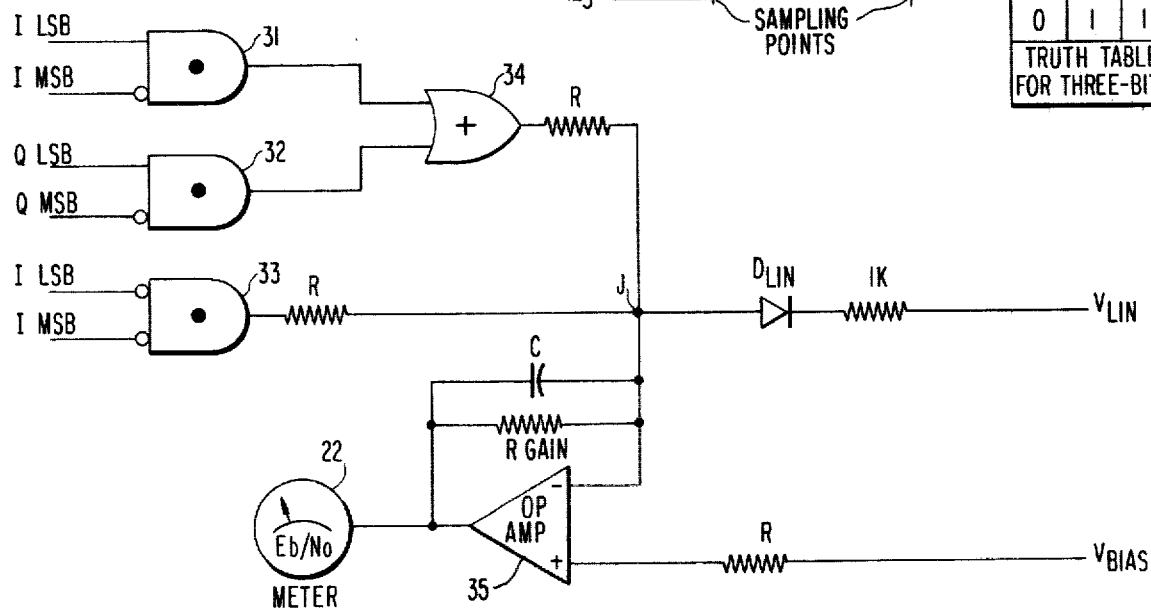
FIG. 3 LOGIC AND INTEGRATION CIRCUIT

QPSK PHASOR DIAGRAM AND CORRESPONDING PROBABILITY DENSITY FUNCTIONS

ON-LINE CHANNEL QUALITY MONITOR FOR A COMMUNICATION CHANNEL

FIELD OF THE INVENTION

The present invention relates to the field of communications, and is more particularly concerned with an on-line device for monitoring the quality of a communication channel.

BACKGROUND OF THE INVENTION

All digital communication channels respond to a digital bit stream representing the intelligence to be transmitted, and convert that bit stream into an analog waveform which waveform depends both on the modulating intelligence and the particular modulating technique employed, i.e., FSK, PSK, and the variations on each of these techniques, i.e., two-phase PSK, four-phase PSK, etc. This modulated signal may itself be employed as a modulating signal for a carrier so that modulated waveform can be up-converted into the desired communication channel. At the demodulator, the inverse process is carried out and thus up-converted signals are down-converted to provide an analog waveform, i.e., baseband, which is operated on to recover a data signal (representative of the transmitted data) and a clocking signal (i.e., symbol clock). The combination of analog waveform and clocking signal is then employed to recover the intelligence in the waveform itself. Throughout this process, i.e., beginning at the modulator, continuing in the communication channel coupling modulator and demodulator, and in the demodulator also, noise corrupts the signal desired to be transmitted. This is manifested in the analog waveform of the demodulator, by deviations in magnitude from a theoretical magnitude which can lead to errors in the process of converting the demoudlated signal to represent the transmitted data. Since the intelligence in the analog waveform is recovered by sampling the waveform at the symbol clock, the magnitude of the analog waveform at those points in time is the basis for the remaining portion of the demodulation process. Furthermore, other conventional circuits are employed for AGC and DC level correction so that peak-to-peak and DC level of the analog waveform are adjusted to nominal levels. Typically, a demodulator will recover the intelligence from the analog waveform by noting the polarity of the waveform at the times of the symbol clock.

The communication art has long been aware of the value of determining quantities such as signal-to-noise ratio, carrier-to-noise ratio, or energy per bit to noise ratio of a communication channel. Any of these quantities provide an indication of the quality of the channel or the capability of the channel to communicate information from a transmitter to a receiver.

Until very recently, however, the only known techniques for measuring these parameters made it necessary to terminate communication of information, and instead, to transmit a known signal along the channel for measurement purposes. This is undesirable for at least two reasons; firstly, when a measurement is being made, the communication channel is incapacitated; and secondly, a measurement only determines the quality of a channel during the time of the measurement interval, and since the quality of a communication channel is a function of time, the measurement user is necessarily forced to interpolate or estimate from the measurement what the quality of the communication channel will be when it is actually transmitting intelligence.

More recently, Keelty and Feher, in "On-Line Pseudo-Error Monitors for Digital Transmission Systems" in *IEEE Transactions on Communications*, Vol. COM-26, No. 8 (August 1978), page 1275 et seq., suggest a technique of pseudo-error detection. Pseudo-error detection involves a secondary decision device, connected in parallel with the main data path. In the implementation suggested by Keelty et al, the secondary path is intentionally degraded and thus, the signal sequence on the secondary path has an error rate much greater than the unknown error rate of the channel being monitored. If a user knows the relationship between the degraded secondary path and the main channel, a relationship can be drawn between the error rate on the degraded secondary path and the desired figure for the channel being monitored.

The accuracy of the result of this process depends, in part, on the accuracy of the knowledge of the relationship between the degraded secondary channel and the channel being monitored. In addition to this source of uncertainty, the technique suggested by Keelty et al to implement the degraded secondary channel requires the addition of circuitry of significant complexity, and therefore, cost.

We disclose hereafter what we believe is a more effective technique, namely, to monitor signal magnitude deviations on a finer level which enables us to reduce monitor complexity and still maintain accuracy. In particular, the Keelty technique is to degrade the baseband signal to produce more frequent "errors," which are defined as a positive signal going negative, or vice versa. On the other hand, we eliminate the necessity of adding signal degradation by counting as an "error" analog signal variations over a much smaller range.

It is one object of the present invention to provide a simple but effective on-line channel quality monitor which does not require interruption of channel communications. It is another object of the present invention to provide such a channel monitor which is capable of monitoring $E_b/N_0$, in a simple but effective and accurate fashion. It is a further object of the present invention to provide for the foregoing apparatus with the addition of relatively simple and inexpensive components. Other and further objects of the invention will become apparent as the description proceeds.

The invention has applicability to any communication channel where an analog sample of the demodulated data is present (commonly known as an eye pattern). The digital channel which necessarily transmits only samples clearly satisfies this requirement and the parameter measured by the inventive circuit is $E_b/N_0$ (ratio of energy per bit to noise). In an analog channel, meeting the foregoing requirment, the parameter measured is S/N or C/N (signal to noise ratio or carrier to noise ratio).

SUMMARY OF THE INVENTION

The monitor of the present invention responds to a soft-decision demodulated representation of a baseband information bearing analog signal and includes logic means, responsive to a multi-bit digital output representing said soft-decision demodulated signal, which provides a logical output when the soft-decision demodulated signal deviates from a predetermined output, and integrating means responsive to the logical output for providing a representation of the average number of logical outputs per unit time. Since the logical output is produced only when the information bearing analog signal deviates from a predetermined magnitude, each logical output represents a pseudo-error. By averaging or integrating the number of pseudo-errors, a figure of merit is provided representing the quality of the communication channel.

Some demodulators for digital communication channels include a soft-decision demodulator, and for those demodulators, the input to the logic circuit can comprise the output of the soft-decision circuit. For other digital demodulators, i.e., those which do not include a soft-decision circuit, a soft-decision demodulator is added, and the input to the soft-decision circuit is provided by the baseband information bearing analog signal.

In order to obtain accurate representation of $E_b/N_0$, the pseudo-errors must be properly weighted, taking into account the range over which the monitor is designed to provide the quality measurement. In an embodiment of the invention which has been constructed for four-phase PSK (QPSK) demodulators, i.e., those including an I and Q channel, the soft-decision demodulator, of course, included an I and Q channel demodulator. The logic circuit is arranged to respond to the multi-bit digital output from one of the soft-decision demodulators (for example the I channel) representing any analog signal magnitude outside a predetermined range. On the other hand, the logic circuit responds only to selected deviations in magnitude on the other (Q) channel. While at first glance this weighting technique might seem to render the monitor "blind" to certain errors, i.e., the non-selected deviations in analog signal magnitude, in practical terms, this is not so. The noise which is effective to provide non-selected magnitude deviations on a Q channel also affects I channel and is therefore detected. The logic arrangement is, along with a simple diode linearization circuit, however, effective in linearizing the logic outputs with respect to $E_b/N_0$ to enable use of a simple indicating circuit.

The monitor of the present invention establishes a region around nominal analog signal magnitude within which the analog waveform must fall, when it is sampled by the symbol clock. Failure of the analog waveform to fall within this region is counted as a pseudo-error, and averaging the pseudo-errors per unit time provides the desired parameter.

Accordingly, the inventive channel quality monitor includes a soft-decision demodulator to provide a multi-bit digital output representative of the magnitude of an intelligence bearing analog signal at the time of a symbol clock, a logic circuit, responsive to the multi-bit output, and providing a specific logic output when the multi-bit output deviates from predetermined patterns (corresponding to analog signal magnitudes of a predetermined range of magnitudes), and integrating means for providing a representation of the average number of logic outputs per unit time.

BRIEF DESCRIPTION OF THE DRAWINGS

To insure that those skilled in the art can readily practice the invention, the following portion of the specification discloses preferred embodiments when taken in conjunction with the attached drawings in which like reference characters identify identical apparatus, and in which:

FIG. 1 is a block diagram of a digital demodulator with the channel quality monitor of the present invention;

FIG. 2 illustrates the soft-decision decoding process;

FIG. 3 is a schematic illustration of the logic and integrating circuit;

DETAILED DESCRIPTION OF A PREFERRED EMBODIMENT

Figure 4:
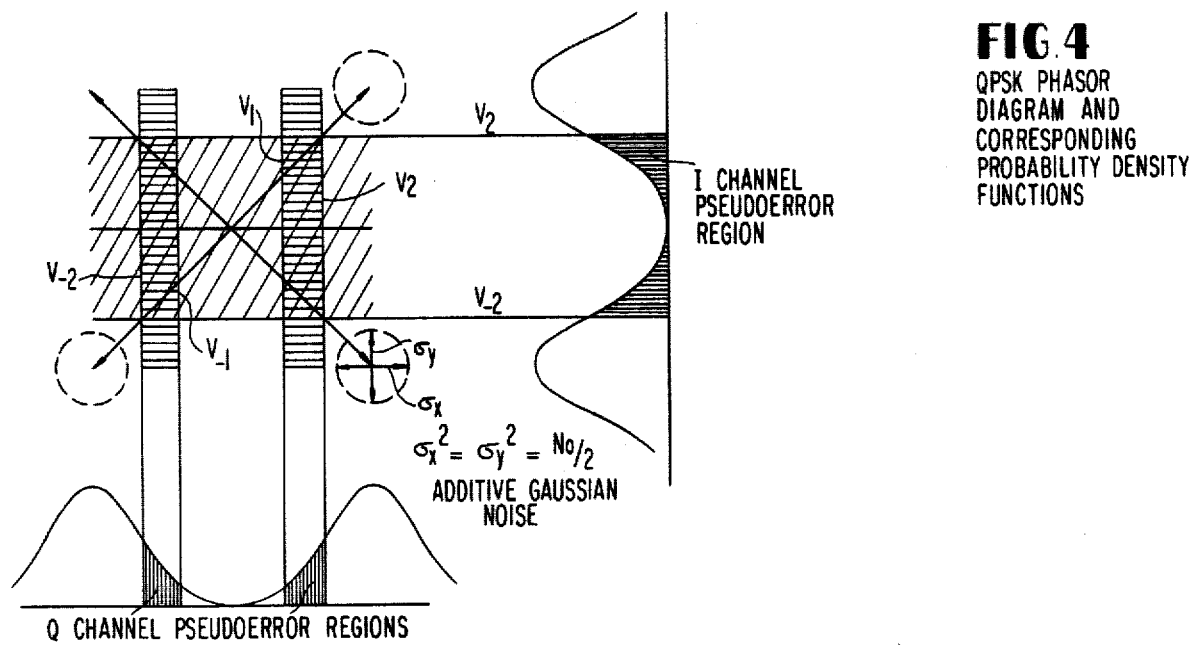
FIG. 4 illustrates the logic operation of the circuit of FIG. 3 in connection with a QPSK signal.

FIG. 1 is a block diagram of an embodiment of the invention and the manner in which it is employed in connection with a digital communication channel demodulator. As mentioned above, however, the inventive channel quality monitor can be used with any channel wherein an eye pattern exists. Thus, the disclosure of the invention in connection with a digital demodulator is exemplary only. FIG. 1 illustrates several components in a conventional digital demodulator. In particular, a signal received for purposes of demodulation is coupled through an IF/AGC circuit 10 which provides for amplification and gain control in a manner well known to those skilled in the art. The input to the circuit is not illustrated in order to represent the generality of the application of the present invention in that it can be applied with demodulators fo demodulating radiated signals, signals coupled over a waveguide, either at microwave or optical frequencies, or the like. The output of the IF/AGC circuit 10 is coupled to a demodulator stage 15 and to a carrier recovery circuit 16. An output of the carrier recovery circuit 16 provides another input to the demodulator stage 15. The demodulator represented in FIG. 1 may comprise, for example, a four-phase PSK demodulator such that the output of the demodulator 15 comprises baseband I and Q channels as is well known to those skilled in the art. These signals are coupled respectively to an equalizer 17 and a symbol recovery circuit 18. The output of the equalizer 17 comprises an I channel and Q channel baseband signals, each of which are analog in form. The output of the symbol recovery circuit 18 is a clocking signal used in the remaining portions of the demodulator to sample the analog signal in the I and Q channels to recover the intelligence contained therein.

As shown in FIG. 1, each of the I, Q and symbol clock is coupled to a soft-decision demodulator 19 comprising an I channel circuit 19i and a Q channel circuit 19q. The soft-decision circuit 19 provides a multi-bit output for each of the I and Q channels on each occurrence of the symbol clock. In the example shown in FIG. 1, the soft decision circuit 19 provides a three-bit output for each channel, but, of course, those skilled in the art will understand that outputs of different numbers of bits can be employed in order to obtain more or less accuracy. The multi-bit outputs from each of the I and Q channels are provided to a logic and integration circuit 20. The logic and integration circuit 20 provides for the detection of pseudo-errors and their integration such that the output of a logic and integration circuit 20 is enabled to drive a meter 22 which is deflected in accordance with a time average value of $E_b/N_0$. The output of the soft-decision demodulator 19 can also be coupled to an AGC monitor circuit 21 to provide an output signal to the IF/AGC circuit 10 to control the gain function. It should be understood that, while a soft-decision circuit is required for each channel, only a single logic and integration circuit are required.

Conventional digital demodulation can employ either hard or soft demodulation. For those demodulators which include hard-decision demodulation, providing a channel quality meter in accordance with the present invention requires the addition of a soft-decision circut 19, the logic and integration circuit 20 and the meter 22. FIG. 1, in illustrating the foregoing components as lying outside of the data path, illustrates the use of the present invention in connection with a hard-decision demodulator.

Other conventional digital demodulators, however, employ soft-decision demodulation and thus, include a soft-decision circuit 19. For those demodulators, the present invention can be implemented by employing the existing output of the soft-decision circuit 19 and simply adding the logic and integration circuit 20 and meter 22.

As an introduction to the description of the structure and operation of the invention, the soft-decision process is first discussed in connection with FIG. 2.

The soft-decision demodulator is a device which maps an analog signal into a multi-bit digital word. The multi-bit digital word contains information on the relative strength of the analog signal with respect to a plurality of equally spaced decision points within the range of the analog signal. For example, FIG. 2 shows an analog signal and seven decision points $V_3$ to $V_{-3}$. The seven decision points allow the analog signal to be mapped into a three-bit digital word, and the three-bit digital word corresponding to each of the regions associated with the seven decision levels is shown at the right of FIG. 2. Since the analog signal continuously changes in magnitude, the decision process is effected at the sampling points also noted in FIG. 2. When used in connection with a digital demodulator, the sampling points are determined by the symbol clock. A soft-decision circuit, as will be understood by those skilled in the art, can be implemented by providing a plurality of comparators, one for each decision level, each comparator provided with a different reference signal for establishing the decision levels $V_3$ to $V_{-3}$, and combining the comparator outputs with conventional logic elements to provide the multi-bit word representative of the signal magnitude. By clocking the logic elements at the sampling points, a circuit is constructed which responds to an analog signal input and provides, at the clocking signals, the multi-bit word representative of the analog signal magnitude at the time of the clocking signal.

Various bit patterns of the multi-bit word produced by the soft-decision circuit represent the magnitude of the analog signal. More particularly, a multi-bit word 101 represents a magnitude between $V_2$ and $V_1$. Since nominal signal level is $V_3$, the three-bit digital word represents a particular increment of noise which has reduced the nominal signal magnitude to the measured signal magnitude. Likewise, the three-bit digital word 100 represents an analog signal magnitude between $V_1$ and $V_0$, and represents a higher level of noise since the nominal signal magnitude of $V_3$ has been reduced even further. Similar considerations apply to the three-bit digital words 000 and 001.

Thus, the inventive monitor measures the signal-to-noise ratio (S/N) by using the pseudo-error information conveyed by the output of the soft-decision circuit. It can be shown mathematically that the ratio of energy per bit to noise, in a digital communication channel, is related mathematically to S/N by the relationship $E_b/N_O=(S/N)\pm K$, where K is a constant dependent upon demodulator implementation and the range over which $E_b/N_O$ is measured. The importance of the range over which the measurement is to be made can be understood by again reviewing FIG. 2. Since the monitor has no a priori knowledge of the information contained in the analog waveform, it has no way of determining whether nominal analog signal magnitude is $V_3$ or $V_{-3}$, although it is clear that it must be one or the other. Thus, a soft-decision output 100 can represent a unit of noise which has reduced the nominal level from $V_3$ to less than $V_1$, or, a greater quantum of noise which has changed the nominal signal level $V_{-3}$ to above $V_O$. By restricting the range of variations in $E_b/N_O$ over which an accurate measurement is to be made, proper weightings can be assigned to the various multi-bit outputs of the soft-decision circuit. The preferred embodiment disclosed herein was designed for coherent QPSK with $E_b/N_O$ measured over the range of 3 to 14 dB.

FIG. 3 is a schematic of the logic and integration circuit 20, and its connection to the meter 22. As shown in FIG. 3, a plurality of two input AND gates are provided with various combinations of the multi-bit outputs of the soft-decision circuits 19$i$ and 19$q$. The input signal references of FIG. 3 correspond to signal references in the truth table of FIG. 2. The output of the AND gates 31 and 33 are provided to an OR gate 34 whose output is coupled through a resistor R to a summing junction J. The output of AND gate 33 is coupled through a resistor of equal resistance, to the same junction J. A voltage source $V_{lin}$ is coupled through a further resistor and a diode $D_{lin}$ to the junction J, with the anode of the diode coupled to the junction J. The diode and voltage source are used to linearize the electrical signal at the meter with respect to $E_b/N_O$. If a non-linear scale is used on meter 22, these components can be eliminated. The summing junction is also connected to one input of an operational amplifier 35, whose output is coupled to the meter 22. A feedback network consisting of a parallel combination of a capacitor C and a resistor $R_{gain}$ connects the summing junction J to the output of the amplifier 35. The other input of amplifier 35 is coupled through a resistor R to a voltage source $V_{bias}$.

In operation, selected bit patterns of the multi-bit outputs of the soft-decision circuit 19, corresponding to a pseudo-error produce a logic output signal which is represented by a high voltage either at the output of OR gate 34 or at the output of AND gate 33 which results in current flow to the junction J. For each such logical output, which is maintained for the duration of a symbol interval, i.e., from one symbol clock to the next, a certain amount of charge is transferred to the capacitor C. A similar quantum of charge can be transferred by a logical output in the next symbol interval, and thus, the capacitor C acts as a counter or summing device to sum the logical outputs presented thereto. At the same time, however, since a discharge circuit exists for the capacitor, the charge transferred to the capacitor by the logical output is drained off at a constant rate. The operational amplifier is also subjected to a DC input on its other terminal. As a result, the output voltage of the amplifier 35, and correspondingly, the reading of meter 22 is defelected below full scale by the time averaged number of logical outputs produced by the summing junction J.

In order to understand the logic employed in FIG. 3, reference is made to FIG. 4.

FIG. 4 illustrates a QPSK phasor diagram, and at the right, a probability density function for one channel, and below a probability density function for the other channel. The darkened areas of the probability density functions represent signal magnitudes producing a logic output. Correlating FIGS. 3 and 4 illustrates that the probability density function at the right corresponds to the I channel, and the probability density function below corresponds to the Q channel. Of course, the I and Q channels can be interchanged with no effect on the operation of the circuit. In order to assist in correlating FIGS. 2, 3 and 4, voltage levels $V_2$, $V_{-2}$ (for the I channel) and $V_2$, $V_1$, $V_{-1}$ and $V_{-2}$ (for the Q channel) have been reproduced in FIG. 4. Referring now to FIG. 3, those skilled in the art will understand that AND gate 31 produces a high output for the bit combination 101 or 001. Likewise, AND gate 33 produces a high output for the bit combination 100 or 000. Accordingly, the logic output is produced for any I channel analog signal magnitude between $V_2$ and $V_{-2}$. On the other hand, AND gate 32 produces a logic output for bit combinations corresponding to 101 or 001, i.e., for the Q channel analog magnitudes between the levels $V_2$ and $V_1$ or $V_{-1}$ and $V_{-2}$. Because of the logic of FIG. 3, any I channel signal amplitude between the level $V_2$ and $V_{-2}$, or a Q channel signal amplitude between $V_1$ and $V_2$ or between $V_{-1}$ and $V_{-2}$, will produce a logic output and thus transfer a quantum of charge to the capacitor C. The particular logic combinations employed in FIG. 3 are effective for measurements within the stated range. Of course, measurements outside this range can be detected by logically combining different bit combinations of outputs from the I and Q soft-decision circuits, but the linearizing circuitry may have to be changed.

The analog signal operated on by the inventive channel quality meter must be AGC controlled and furthermore should be relatively free of DC offset. The AGC requirement is easily met by conventional techniques; DC offset requirement can be met by the DC offset detector and correction circuit forming the subject of an application (DC-16) filed on even date, by the inventors named herein. In the alternative, many high quality relatively low rate modems exhibit sufficiently low DC offset so as to require no further correction. We do not attempt to use the bit combinations 111, 110, 011 or 010 since each may represent an infinitesimally small noise contribution. However, the bit combinations 101, 001, 000 and 100 represent definable noise contributions and are noted and responded to by the inventive circuit. Since the noise is assumed Gaussian, the logic circuit of FIG. 3 detects the rate of pseudo-errors. In designing a logic circuit for the generalized n channel mode, with m levels of soft-decision demodulation, each bit combination representing a pseudo-error is detected, equally weighed, and counted. In the logic circuit of FIG. 3, certain bit combinations (000, 100) on the Q channel were ignored since we found better linearity between $E_b/N_O$ and meter input voltage without them. The diode $D_{lin}$ and source voltage $V_{lin}$ were selected to increase the same linearity. While linearity is desirable, allowing a standard meter 22 to be employed, it is not essential, and thus, the selection of bit combinations for use and the use of linearizing circuitry is optional.

Figure 5:
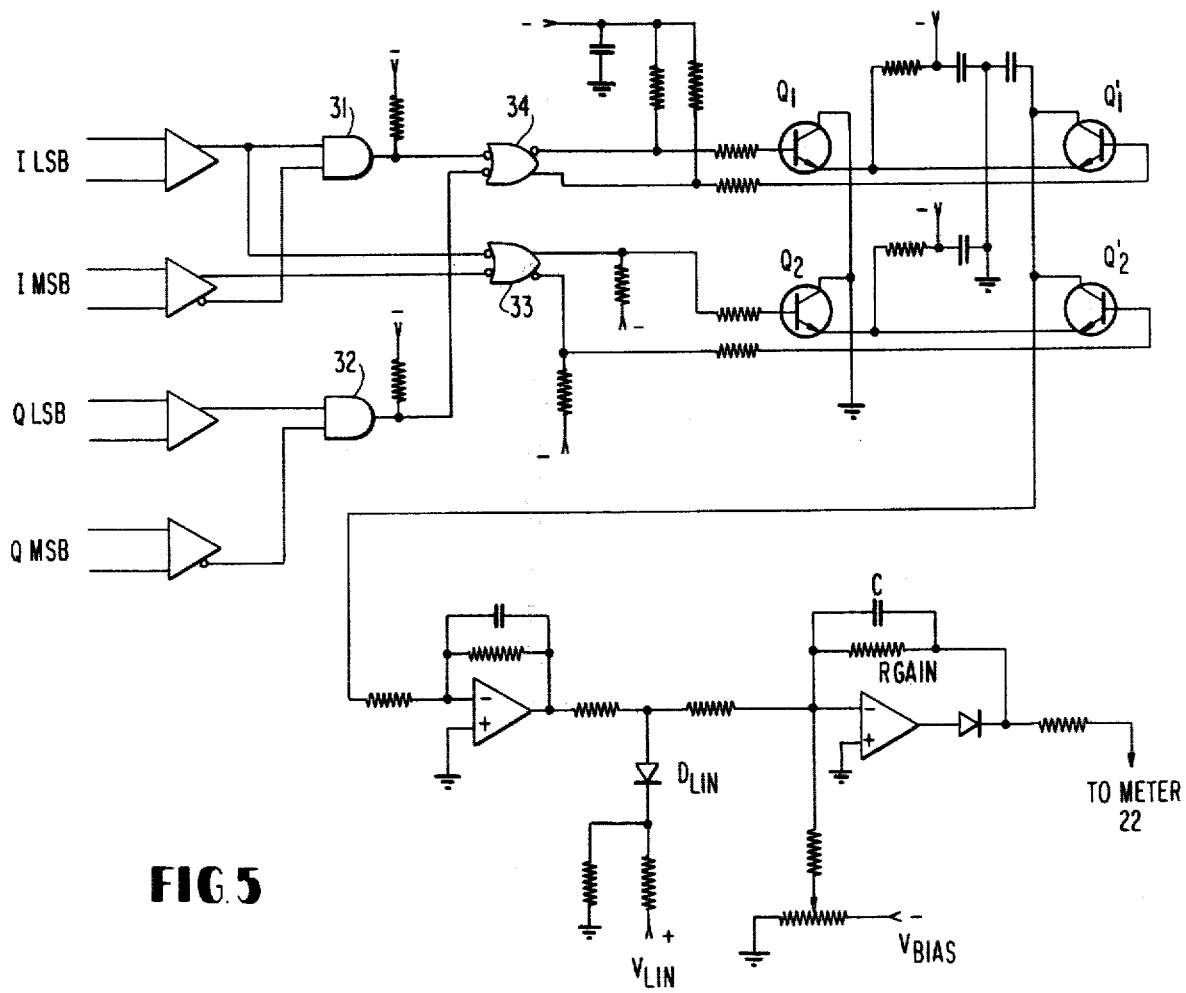
FIG. 5 is a circuit diagram of a preferred embodiment of the invention.

A preferred embodiment of the invention was designed to operate at transmission rate in the range from 32 kbps. to over 25 Mbps. In order to handle the upper end of this range, the logic was implemented in ECL. To further assist in reducing switching speed at this relatively high rate, the outputs of the gates 33 and 34 are employed to drive current switches as shown in the circuit of FIG. 5, in which the current switches Q1-Q1' and Q2-Q2' are operated to transfer charge to the capacitor C depending upon the logical output of the gates 33 and 34, as explained with reference to FIG. 3.

For a description of a digital demodulator for which the preferred embodiment of the channel monitor was designed, see "An Optimum Mulit-Rate QPSK Modem" appearing in the *Conference Record, International Conference on Communications ICC'78, Vol. II, Session 25.5.1.*

Although the preferred embodiment disclosed herein is arranged for a QPSK demodulator, those skilled in the art will be able to adapt the teachings herein for demodulators using more or less than four phases. In addition, the selection of bit patterns selected for counting by the logic circuit can be altered although desirably, a linear relation should be maintained between $E_b/N_O$ and the integrated output.

what is claimed is:

1. A communication channel monitor for monitoring channel quality for channels of the type transmitting analog samples of data and which channel includes a demodulator for providing an information bearing analog signal and a symbol clock, said communication channel monitor comprising:
    soft-decision demodulation means responsive to said analog signal and to said symbol clock for providing a multi-bit digital output at the rate of said symbol clock,
    logic means responsive to said multi-bit digital output for providing a specified logic output each time said multi-bit digital output corresponds to one of a selected number of predetermined bit patterns, and
    integrating means responsive to said logic output for providing a representation of average number of specific logic outputs per unit time.

2. The apparatus of claim 1 in which said demodulator is a four-phase digital demodulator which provides I and Q channel analog signals, said soft-decision demodulation means comprising a pair of soft-decision circuits, each responsive to one of said I and Q analog signals, and producing I and Q multi-bit outputs representing respectively, I and Q analog signal magnitudes, said logic means is responsive to I and Q multi-bit outputs.

3. The apparatus of claim 1 in which said soft-decision demodulator means provides one of a number of possible multi-bit outputs representing analog signal magnitude, and
    said logic means produces a specific logic output if said multi-bit output is one of a predetermined number of potential multi-bit outputs.

4. The apparatus of claim 3 in which said logic means produces a specific logic output for multi-bit digital inputs representing an analog signal magnitude below a predetermined absolute magnitude.

5. The apparatus of claim 1 in which said integrating means comprises an active R-C integrator.

6. The apparatus of claim 5 in which said active R-C integrator includes a linearizing diode coupled to a source of potential and an output of said logic means.

7. The apparatus of claim 5 in which said integrator has two inputs, one coupled to said logic output and the other coupled to a reference signal.

8. The apparatus of claim 2 in which said logic means produces a specific logic output for any multi-bit output of one of said I or Q outputs representing an absolute magnitude below a predetermined threshold, and a specific logic output for the other of said I and Q multi-bit outputs representing only some of said magnitudes below said predetermined threshold.

9. A digital communication channel monitor for monitoring channel quality in which said channel includes a soft-decision demodulator producing a multi-bit output repeating at a rate of received symbols, each said multi-bit output representing an analog signal magnitude; in which said monitor comprises:
logic means responsive to said multi-bit output for providing a specific logic output for each multi-bit output representing an analog signal magnitude outside a predetermined magnitude range, and
integrating means responsive to said specific logic output for providing a representation of average number of logic outputs per unit time.

10. The apparatus of claim 9 in which said demodulator is a QPSK demodulator, said soft-decision demodulator multi-bit output including I and Q channel multi-bit outputs, and in which said logic means responds to both said I and Q channel multi-bit outputs.

11. The apparatus of claim 9 in which said soft-decision demodulator provides one of a number of possible multi-bit outputs representing analog signal magnitude, and
said logic means produces a specific logic output if said multi-bit outputs is one of a predetermined number of potential multi-bit outputs.

12. The apparatus of claim 11 in which said logic means produces a logic output for multi-bit inputs representing an analog signal magnitude below a predetermined absolute magnitude.

13. The apparatus of claim 9 in which said integrating means comprises an active R-C integrator.

14. The apparatus of claim 13 in which said active R-C integrator includes a linearizing diode coupled to a source of potential and an output of said logic means.

15. The apparatus of claim 10 in which said logic means produces a logic output for any multi-bit output of one of said I and Q multi-bit outputs representing an analog signal of magnitude below a predetermined threshold, and a logic output for the other of said I and Q multi-bit outputs representing only some of said magnitudes below said predetermined threshold.

16. A channel quality monitor for a four-phase PSK digital communication channel providing $E_b/N_O$ information, where $E_b$ is energy per bit and $N_O$ is noise, in a digital demodulator which provides an information bearing analog signal and a symbol clock, in which said monitor comprises:
soft-decision demodulator means producing I and Q multi-bit outputs at the rate of said clock, each output representing I or Q analog signal magnitude,
logic means responsive to said I and Q multi-bit outputs for providing a specific logic output for multi-bit outputs representing an analog signal magnitude deviating from a predetermined analog signal magnitude range, and
averaging means for averaging logic outputs per unit time.

17. The apparatus of claim 16 in which said logic means produces a specific logic output for each multi-bit input from one said I or Q multi-bit output representing an analog magnitude outside a predetermined analog signal magnitude range, and also produces a specific output for some, but not all, of said other I or Q multi-bit outputs representing an analog magnitude outside said predetermined analog signal magnitude range.

18. The apparatus of claim 17 in which said multi-bit outputs include a sign bit, a most significant bit (MSB) and a least significant bit (LSB) and in which
said logic means produces a logic output for $LSB \cdot \overline{MSB}$ or $\overline{LSB} \cdot \overline{MSB}$.

19. The apparatus of claim 17 in which said I multi-bit output comprises IMSB (most significant bit) and ILSB (least significant bit) said Q mulit-bit output comprises QMSB (most significant bit) and QLSB (least significant bit) and in which said logic means determines a logic output by $ILSB \cdot \overline{IMSB} + QLSB \cdot \overline{QMSB} + \overline{ILSB} \cdot \overline{IMSB}$.

20. An on-line channel monitor for a digital demodulator including an information bearing baseband analog signal and a symbol clock, in which said monitor comprises:
pseudo-error measuring means responsive to said information bearing baseband analog signal for producing a pseudo-error signal, and
averaging means responsive to said pseudo-error signal for providing a time averaged sum of said pseudo-errors,
wherein the improvement comprises pseudo-error measuring means including means for producing a pseudo-error signal when said baseband analog signal magnitude, at the time of a symbol clock, is outside of a predetermined magnitude range.

* * * * *